United States Patent [19]

Jones et al.

[11] Patent Number: 5,149,032
[45] Date of Patent: Sep. 22, 1992

[54] UNIVERSAL CUP HOLDER FOR USE IN VEHICLES

[76] Inventors: Stephen W. Jones, 710 Commercial St., Emporia, Kans. 66801; Mitchell H. Babkes, 8444 W. Birch La., Wichita, Kans. 67212; David D. McCormick, 8830 Maple Dr., Overland Park, Kans. 66207

[21] Appl. No.: 620,347

[22] Filed: Nov. 29, 1990

[51] Int. Cl.⁵ .............................................. A47K 1/08
[52] U.S. Cl. ................................... 248/154; 248/313; 248/316.4
[58] Field of Search ............... 248/154, 149, 150, 670, 248/680, 681, 310, 311.2, 313, 314, 316.4, 316.6, 346; 297/188; 220/85 H; 224/42.45 R; 74/575, 578

[56] References Cited

U.S. PATENT DOCUMENTS

| | | | |
|---|---|---|---|
| 2,622,835 | 12/1952 | Ippolito | 248/310 |
| 3,028,702 | 4/1962 | St. Cyr . | |
| 3,036,717 | 5/1962 | Johnson | 248/311.2 |
| 3,090,478 | 5/1963 | Stanley . | |
| 3,317,069 | 5/1967 | Chin . | |
| 3,491,976 | 1/1970 | Larson . | |
| 4,422,610 | 12/1983 | Hunt | 248/311.2 |
| 4,458,874 | 7/1984 | Rabas | 248/670 |
| 4,467,934 | 8/1984 | Hummer . | |
| 4,606,523 | 8/1986 | Statz et al. . | |
| 4,721,216 | 1/1988 | Kinder . | |
| 4,943,111 | 7/1990 | Vander Laan | 248/311.2 |
| 4,948,080 | 8/1990 | Jack | 248/311.2 |

*Primary Examiner*—Carl D. Friedman
*Assistant Examiner*—Derek J. Berger
*Attorney, Agent, or Firm*—Hovey, Williams, Timmons & Collins

[57] ABSTRACT

A universal cup holder (10) for use in vehicles comprising a base (12) having a pair of fixed upright arms (14,16); an adjustable unit (18) shiftably carried by the base (12), the adjustable unit (18) including a pair of upright arms (20,22) which are shiftable toward and away from the fixed arms (14,16) whereby to permit the creation of a cup receiving area (24) of differing sizes within the confines of the arms (14,16,20,22) with open spaces (26,28,30,32) being between all of the arms for receiving the handle, if present, on the container positioned within the cup receiving area (24). Incremental shifting of the unit (18) is permitted by a ratcheting pawl assembly (56) which, once the cup receiving area (24) has been defined may be locked by means (64) to retain the area (24) in its desired dimension.

8 Claims, 2 Drawing Sheets

UNIVERSAL CUP HOLDER FOR USE IN VEHICLES

BACKGROUND OF THE INVENTION

1. Field of the Invention

The present invention is concerned with the safe and stable retention, in moving vehicles, of various types of beverage containers such as, for instance, cups, mugs, cans and squeeze bottles and which containers are of varying sizes, particularly diameters. It is desirable to have a single, universal cup holder which may be safely retained within the vehicle, normally within reach of the driver of the vehicle and which holder will readily receive a beverage container of any diameter. The present universal holder fills this need in that it provides a readily adjustable holder which may be placed in a selected position in the vehicle and then adjusted by the user, through the shiftable movement of an adjustable unit, to selectively create a cup receiving area, which area may be varied by the user, depending upon the particular beverage container sought to be held. The largest of the cup receiving areas attainable through use of the present holder will accommodate the largest presently known consumer type of beverage container and in its closed condition the holder will present a cup receiving area just slightly smaller than the conventional beverage can, whereby such a can may be snugly received within the holder.

2. Description of Prior Art

While various types of cup holders for vehicles have been provided, most of the same merely present a cup receiving area of fixed diameter which will not accommodate beverage containers of widely differing sizes, as are commonly in commerical use today. Such fixed dimension holders are not adjustable by the user to cause the same to accommodate either larger or smaller diameter containers than that for which they are initially intended.

There have been prior art teachings of cup holders having a plurality of upstanding flexible arms, such as shown in U.S. Pat. No. 3,491,976 to Larson, dated Jan. 27, 1970, but the structure shown by said patent does not contemplate the provision of a pair of fixed legs together with an adjustable unit which carries a pair of legs, the legs cooperating to define the cup receiving area and being universally adjustable to accommodate a container of any presently known size. U.S. Pat. No. 3,090,478 issued May 21, 1963 to Stanley, contemplates a carrier for containers which has a number of different sized inserts whereby to accommodate containers of differing diameters.

Other prior art devices contemplate the use of spring fingers or rings or stepped, staggered walls in an attempt to create a holder which will receive various sizes of beverage containers.

SUMMARY OF THE INVENTION

A universal cup holder particularly intended for use in vehicles and to accommodate beverage containers of varying diameters is provided. The holder includes a base which is retained suitably within the vehicle such as, for instance, by a stablizing leg which attaches to the holder at one end with the other end of the leg being wedged between the seat and back cushions of the vehicle seat. Other methods of retaining the cup holder within the vehicle might include use of hook and loop fasteners, adhesive attachment, a mounting plate supported by bean bags, a stand which would position the holder within reach of the user, and various other supporting and retaining means which would permit the cup holder to be placed and retained in the vehicle within easy reach of the user, whether such be the driver or a passenger.

The cup holder itself is comprised of a base which presents a pair of fixed, upwardly extending arms. An adjustable unit which is longitudinally shiftable with respect to the base also presents a pair of upright arms, the arms and the unit being shiftable toward and away from the fixed arms whereby to permit the user to create, within the confines of the arms, a cup receiving area which will accommodate and tightly retain a beverage container of any currently known size, such as a large 64 ounce cup or a conventional beverage can such as a soda can. The ready adjustability of the holder renders it universal in nature. There is provided means for locking the adjustable unit in a predetermined position with respect to the base whereby the desired size of cup receiving area may be affirmatively maintained.

To accommodate beverage containers such as mugs or coffee cups, the arms are positioned in such a relative disposition that there are open spaces between all of the arms so that if a mug with a handle is positioned within the cup/mug receiving area the handle may extend outwardly through one of the open spaces.

The arms are each provided with ribs on the faces thereof proximal to the container to engage the outer wall of the container and assist in confining it in a stabilized vertical condition within the cup receiving area, but yet permit easy withdrawal and reinsertion of the container with respect to the receiving area.

The adjustable unit is slidable with respect to the base in small increments so that relatively minor adjustments can be made to ensure that the cup is tightly retained within the holder, this being accomplished by a ratcheting pawl which has lock means provided therefor so that the adjustable unit may be secured with respect to the base of the cup holder.

Yet further, it is contemplated that the entire holder or its base, once positioned in the vehicle, may be utilized to accommodate other useful accessories. For instance, a clipboard could be suitably engaged with notches provided in the arms of the cup holder whereby to present a horizontal writing surface for the user of the cup holder and its clipboard accessory. Also, various sizes and types of pouches or other recepticles for receiving miscellaneous articles could be suitably positioned on or suspended from the cup holder and thereby retained for ready access by the user of the holder.

DESCRIPTION OF THE PREFERRED EMBODIMENT

The cup holder 10 is intended to receive beverage containers of any size and type, ranging from the smallest in diameter such as, for instance, a beverage can, to the largest presently utilized consumer beverage container such as a 64 ounce cup. As hereinafter used, the term "cup" is intended to include various beverage containers, whether they be in the specific form of a cup, a mug, a can, a glass, a bottle or any other known container which is intended to receive a beverage to be consumed by a person in a vehicle.

To this end the cup holder is universal in its ability to accommodate a cup of any diameter and to retain the same firmly and safely within the holder. The holder is in turn firmly and safely retained within the vehicle where it is being used so that the user need not be concerned with the possibility of the container tipping and spilling the beverage, whether it be an open top glass, cup or mug or a can with a limited opening.

Figure 2:
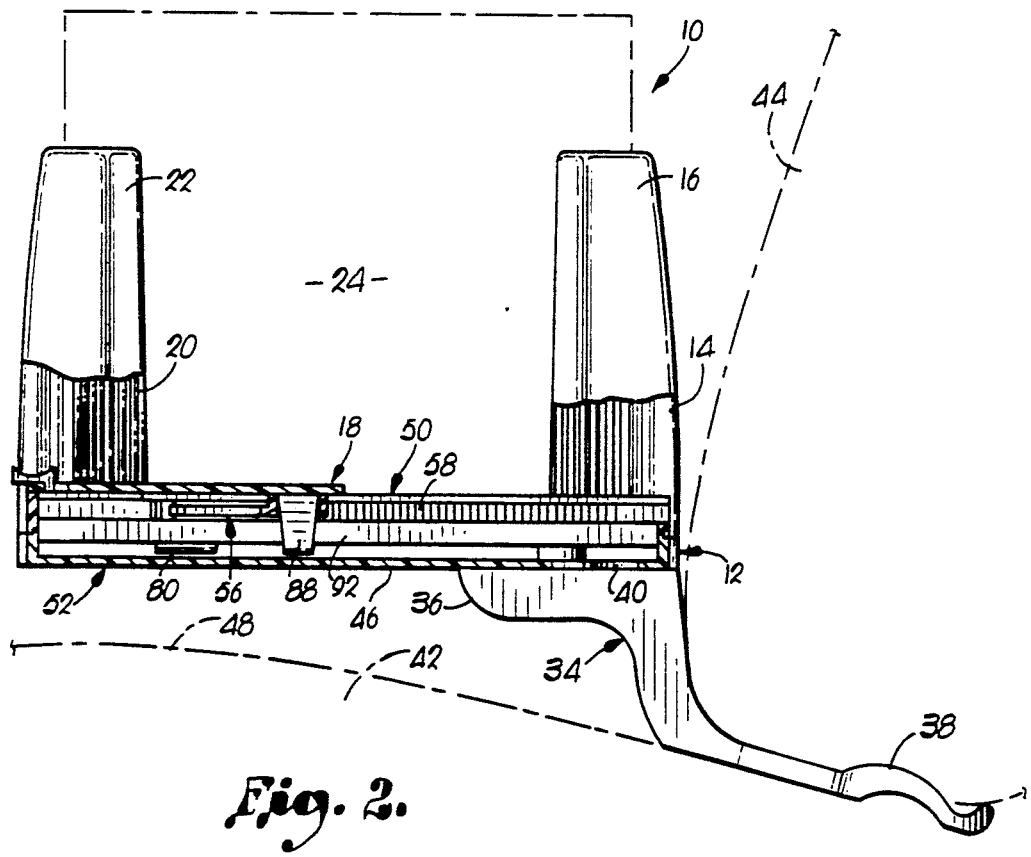
FIG. 2 is a side elevational view of the cup holder, portions being broken away and in section to reveal details of construction.

Cup holder 10 has, as its basic components, a base 12 which includes a pair of fixed upright arms 14 and 16 secured thereto as clearly shown in the drawings. The base also carries a shiftable unit, broadly designated as 18, which unit 18 in turn carries a pair of upright arms 20 and 22 which are shiftable together with unit 18 toward and away from the arms 14 and 16 to define, within the confines of the arms 14, 16, 20 and 22, a cup receiving area designated as 24. A cup, shown in dashed lines in FIG. 2, is positioned in area 24 when holder 10 is in use.

While the arms 14, 16, 20 and 22 define the cup receiving area 24, there are open spaces between all of the arms such as 26, between arms 14 and 20; 28, between arms 14 and 16; 30, between arms 16 and 22; and 32, between arms 20 and 22. These open spaces are particularly provided so that when a cup or mug with a handle is positioned within the receiving area 24, the handle thereof may extend through any one of the open spaces 26–32 as selected by the user and thereby place the cup in a position with its handle at the most convenient location for the user of the cup holder 10.

Figure 1:
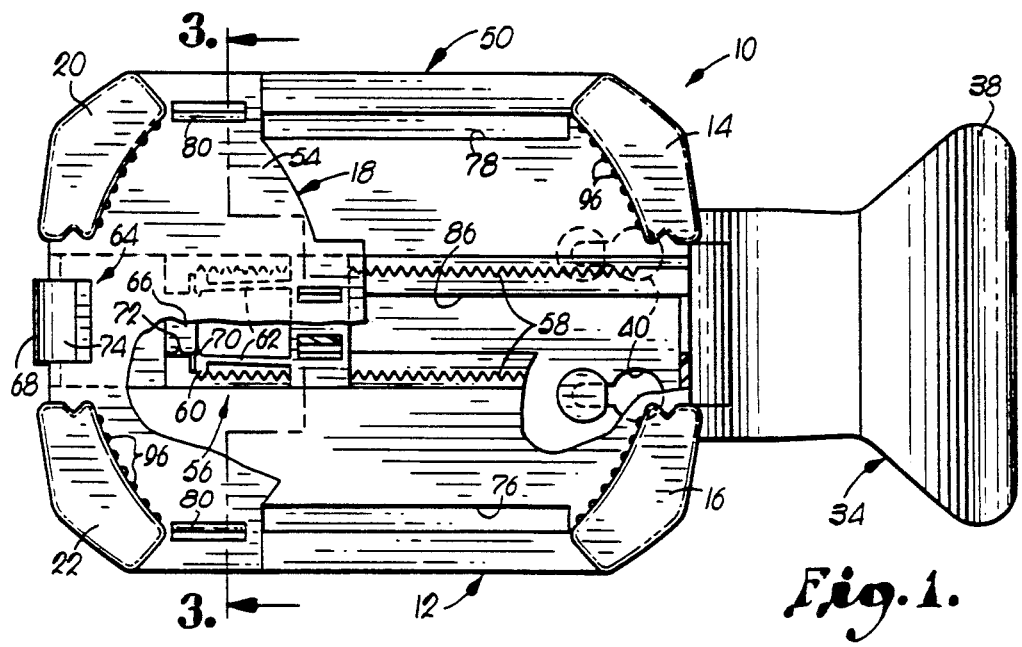
FIG. 1 is a top plan view of the universal cup holder for use in vehicles, with a stabilizer leg shown attached thereto, portions being broken away to reveal details of construction, the holder being shown in its position defining the largest cup receiving area.

In the embodiment of the invention illustrated in the drawings, the cup holder 10 is shown as positioned in the vehicle through utilization of a stabilizer leg 34 having a pair of ends 36 and 38. As best illustrated in FIGS. 1 and 2 of the drawing, the end 36 of stabilizer leg 34 is attached to the base of the cup holder 10 through utilization of a pair of projections on the end 36 which are engageable within keyhole slots such as 40 formed in the base 12 of the holder 10. It will be appreciated that several pairs of keyhole slots such as 40 may be provided in base 10 at various locations to permit alternate mounting positions and that, if desired, a latch may be provided to additionally retain end 36 of leg 34.

The other, free end 38 of the leg 34 is wedged between the seat portion 42 and the back portion 44 of the seat of the vehicle within which the holder is being utilized to thereby stabilize the holder 10 within the seat adjacent the driver or a passenger of the vehicle. It is to be noted that the leg 34 is offset, as illustrated, so that when the free end 38 thereof is wedged into the seat, the holder 10 will be maintained in a level, horizontal position, notwithstanding the inclination of the seat. Thus, a stabilizer arm such as 34 may be used in vehicles having bench seats or bucket seats and in the passenger seat when only the driver is present to position the cup holder 10 within easy reach of the user thereof.

It is also within the contemplation of this invention that the cup holder 10 might be secured in a vehicle through the use of hook and loop material wherein the hook portion would be attached to the lower surface 46 of base 12 and the loop portion attached to the upper surface 48 of seat portion 42 whereby when the hooks and the loops were engaged the holder would be readily retained on the seat of the vehicle for convenient usage.

Also, adhesive could be utilized to suitably attach the cup holder 10 within the vehicle or, in the case of unusual configurations, bean bags might be used to support and retain the cup holder within the vehicle in a position for ready access and use.

For purposes of construction and assembly, the base 12 may be formed from two pieces such as an upper section 50 and a subbase 52, as best illustrated in FIG. 2, the upper section 50 of the holder being adapted to fit over the subbase 52 and suitably attached thereto, such as by a snap fit or by screws, whereby subbase 52 may be joined together with section 50 and its components such as the arms 14 and 16.

The shiftable unit 18 includes a movable plate 54 which has mounted thereon, in a fixed position, the arms 20 and 22 whereby when the plate 54 is shifted by the user the arms 20 and 22 move therewith.

Figure 4:
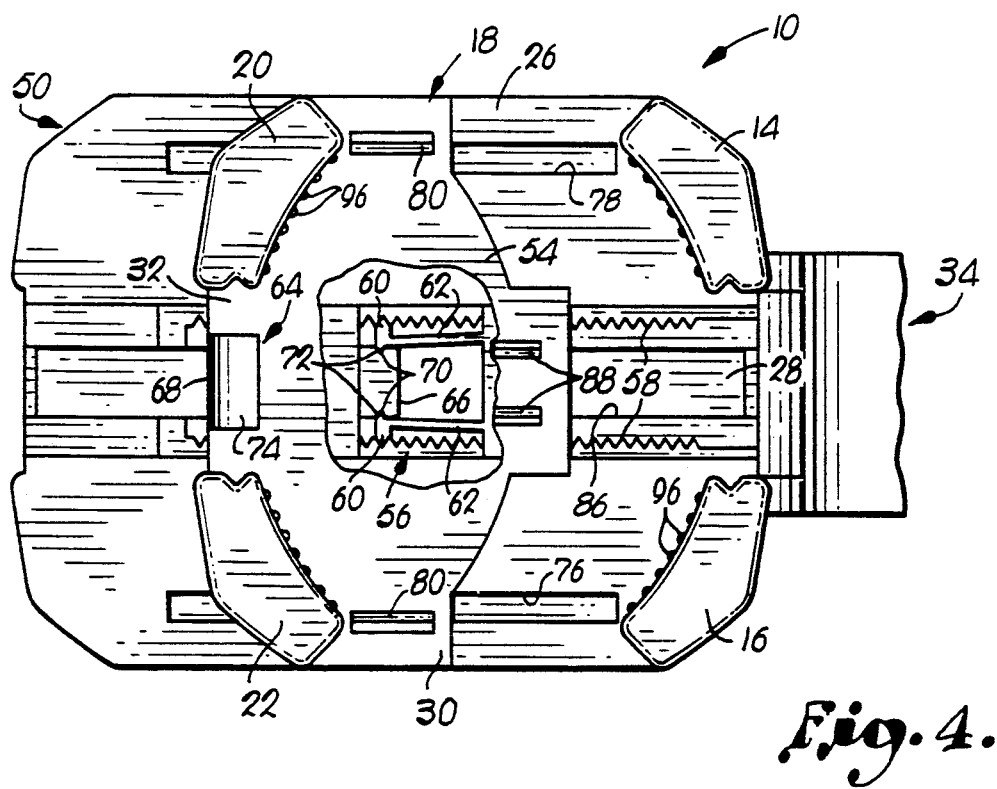
FIG. 4 is a top plan view showing the cup holder adjusted to and locked in its position defining cup receiving area smaller than that shown in FIG. 1.

In order to permit incremental sliding movement of the plate 54 and arms 20 and 22, a ratcheting pawl assembly 56 is positioned between the base 12 and slidable plate 54. Such assembly takes the form of a pair of opposed sets of teeth 58 disposed as illustrated and which are engageable with pawls 60 carried at the outer ends of flexible arms 62. Thus, as linear pressure is applied to either the plate 54 or the upstanding legs 20–22 by the user, the plate and legs will move to the right, viewing FIGS. 1 and 4, for instance, and the pawls 60 will be ratcheted over the teeth 58 whereby to provide incremental movement for the plate 54 and the legs 20–22 with respect to the base 12, all to the end that the relative position of the legs 20–22 with respect to the legs 14–16 may be rather minutely adjusted to ensure that the cup receiving area 24 not only accommodates the desired container but that the arms snugly engage the container to ensure its retention within the holder 10.

When the desired cup receiving area, as defined by legs 14–16 and legs 20–22 has been reached by ratcheting the plate 54 incrementally through the use of assembly 56, the assembly 56 may be locked in the desired position through utilization of locking means 64 which is in the nature of a slidable unit having a pair of opposed ends 66 and 68. The end 66, upon shifting movement of the locking means 64 to the right viewing FIG. 4, will wedge between the pawls 60 and their respective flexible arms 62 and cause a small boss 70 on the inner side of each of the pawls 60 to seat within a corresponding notch 72 formed in the edge of the end 66 of locking means 64. The locking means 64 is actuated in a longitudinal, generally horizontal path, by means of a fingertab 74 which is presented at one end 68 of the locking means 64.

Figure 3:
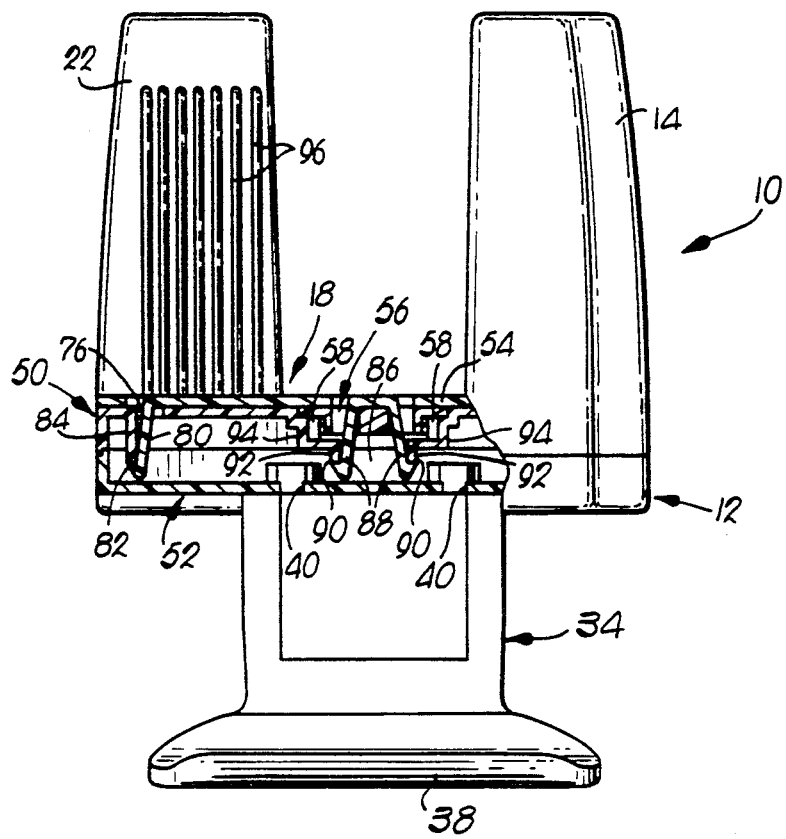
FIG. 3 is a sectional view taken along line 3—3 of FIG. 1.

To facilitate the shifting movement of the unit 18 with respect to base 12, trackways are provided at each side of the base 12 and in the center thereof. Thus, on each side of the upper section 50 of the base 12 a slot 76 and 78 is formed through the section 50 permitting a downwardly extending flange such as 80 which is formed as part of plate 54, to extend through the slot 76 and present a return lip 82 which engages a downwardly extending wall 84 formed in the base 12, all as best illustrated in FIG. 3. A similar trackway is presented on the opposite side of the base 12 to that illustrated in FIG. 3 in cross-section. A central slot 86 is formed in the upper section 50 of base 12 which accommodates downwardly extending flanges 88 as seen in FIG. 3 which each have a return lip 90 engaging tracks 92 presented by an interior wall 94 of base 12 as best illustrated in FIG. 3. The flanges 80 and 88, through their engagement with the corresponding walls 84 and 92 also serve to snap fit section 50 onto subbase 52 in assembling the holder 10. The same interior wall 94 also presents a trackway for the reciprocal sliding movement of the ratcketing pawl assembly 56 as hereinabove described.

Accordingly, it will be appreciated that when the cup holder 10 is to be placed into use it is positioned within the vehicle such as through utilization of a stabilizer leg as shown at 34. In its initial positioning, the holder might be set with the arms thereof their greatest distance apart, as illustrated in FIG. 1, so that the cup receiving area 24 as initially defined by legs 14-16 and 20-22 would be at its greatest dimension. Then, with a cup or other suitable beverage container being positioned within the area 24, the shiftable unit 18 would be moved to the right viewing FIG. 1 and ratchet through the increments defined by teeth 58 to a position where the arms 20 and 22, cooperating with fixed arms 14 and 16, would snugly engage the outer wall of the container as illustrated in FIG. 2. To ensure a snug fit between the arms and the outer wall of the container, each of the arms 14, 16 and 20, 22 is provided, on the face thereof proximal to the cup, with a plurality of ribs 96 which would normally actually engage the outer surface of the cup or container and serve to retain it well within the cup receiving area 24 but also facilitate the vertical removal and replacement movement of the cup during use.

It will be appreciated that once the cup receiving area has been predetermined and set as described above, it may then be locked in that position through utilization of the locking means 64 whereby the receiving area 24 will subsequently accommodate containers of the same diameter without the necessity of readjusting the holder 10.

The entire cup holder 10 may be fabricated from a suitable plastic material for ease in construction and assembly and which material is attractive in the presentation of the finished product. The arms 14-16 and 20-22 are preferably on the order of three inches in height whereby to substantially embrace most normal beverage containers and ensure the vertical stability thereof while within the holder 10.

Thus there is provided a cup holder which is readily receivable within a vehicle; which may be positioned conveniently for the use of a driver or a passenger in the vehicle and which is quickly and readily adjustable to accommodate a beverage container of virtually any diameter and retain the same in a stable upright condition.

We claim:

1. A universal cup holder for use in vehicles comprising:
   a base including a pair of fixed, upright arms;
   an adjustable unit shiftably carried by said base;
   a pair of upright arms carried by said adjustable unit, said unit and said arms being shiftable toward and away from said fixed arms whereby to vary the distance between the fixed arms and the shiftable arms to thereby permit the creation of cup receiving areas of differing sizes within the confines of said arms; and
   means for locking said adjustable unit in a predetermined position with respect to said base, said locking means including a ratchet and pawl assembly for permitting incremental sliding shifting movement of the adjustable unit with respect to the base and a lock for said ratchet and pawl assembly, said lock being longitudinally slidable with respect to said assembly to engage the pawl during travel of the lock to cause the pawl to remain engaged with the ratchet to thereby lock the adjustable unit in the aforementioned predetermined position.

2. A universal cup holder as set forth in claim 1, there being open spaces between all of said arms when the cup holder is in use with any size of cup receiving area, whereby a handle on said cup may extend through any one of said open spaces.

3. A universal cup holder as set forth in claim 2, each of said arms having ribs on at least the face thereof proximal to the cup, when it is positioned within the cup receiving area, for engaging the cup to assist in confining it in said area.

4. A universal cup holder as set forth in claim 3, there being means for selectively positioning the cup holder in the vehicle and retaining it in the selected position, said positioning means including a stabilizer leg having one end thereof attached to the cup holder and the other end thereof being inclined downwardly from said one end and being adapted to be wedged between the cushions making up the seat of the vehicle in which the cup holder is being used.

5. A universal cup holder as set forth in claim 4, there being trackways defined by said base and engageable by said adjustable unit whereby to facilitate said incremental sliding movement of said adjustable unit with respect to the base.

6. A universal cup holder as set forth in claim 1, said lock having a pair of opposed ends, one of said ends engaging the pawl during travel of the lock.

7. A universal cup holder as set forth in claim 6, said one end having a notch formed therein adapted to receive a corresponding boss on the pawl to thereby retain said lock with respect to said pawl.

8. A universal cup holder as set forth in claim 7, the other end of said lock having a finger tab thereon for facilitating the longitudinal sliding movement of the lock with respect to the ratchet and pawl assembly.

* * * * *